United States Patent
Gonnsen

(10) Patent No.: US 10,543,922 B2
(45) Date of Patent: Jan. 28, 2020

(54) FLIGHT ATTENDANT SEAT, SYSTEM COMPRISING FLIGHT ATTENDANT SEAT AS WELL AS ARRANGEMENT AND AIRCRAFT AREA COMPRISING SYSTEM

(71) Applicant: Airbus Operations GmbH, Hamburg (DE)

(72) Inventor: Johannes Gonnsen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 296 days.

(21) Appl. No.: 15/602,291

(22) Filed: May 23, 2017

(65) Prior Publication Data
US 2017/0341753 A1    Nov. 30, 2017

(30) Foreign Application Priority Data
May 24, 2016  (EP) .................................. 16171020

(51) Int. Cl.
 B64D 11/00 (2006.01)
 B64D 11/04 (2006.01)
 (Continued)

(52) U.S. Cl.
 CPC ............ *B64D 11/0691* (2014.12); *A47C 1/00* (2013.01); *A47C 1/126* (2013.01); *A47C 9/00* (2013.01);
 (Continued)

(58) Field of Classification Search
 CPC ....... B64D 11/04; B64D 11/06; B64D 11/062; B64D 11/0691; B64D 11/0602;
 (Continued)

(56) References Cited

U.S. PATENT DOCUMENTS

| | | | | |
|---|---|---|---|---|
| 1,369,633 A | * | 2/1921 | Hibbard | B60N 2/3011 297/51 |
| 2,257,103 A | * | 9/1941 | Brokering | B64D 11/06 244/118.6 |
| 4,913,487 A | * | 4/1990 | Breckel | A47C 9/06 297/14 |
| 4,993,666 A | * | 2/1991 | Baymak | B09B 1/00 244/122 R |

(Continued)

FOREIGN PATENT DOCUMENTS

| | | |
|---|---|---|
| DE | 102008009938 | 9/2009 |
| DE | 102011116519 | 4/2013 |

(Continued)

OTHER PUBLICATIONS

Translation of FR 2,980,457 A1 (Year: 2013).*
European Search Report, dated Oct. 26, 2016, priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

A flight attendant seat comprises a carrier having a guide with opposed first and second ends, and a storage compartment receiving the guide first end. The guide provides guidance along its length between its first and second ends. The seat comprises a plurality of segments, each slidingly mounted to the guide to allow a sliding movement of the segments along the guide and relative to the carrier device between a stored position of the segments within the storage compartment, and an exposed position of the segments. A seat element is pivotally mounted to a first of the segments pivotable between an inoperative and operative seat forming position. At least one backrest is mounted to at least a second of the segments. With the segments in their exposed position, the seat element, when pivoted to its operative position, together with the backrest(s), can be used as a flight attendant seat.

19 Claims, 2 Drawing Sheets

(51) Int. Cl.
*B64D 11/06* (2006.01)
*A47C 1/00* (2006.01)
*A47C 1/126* (2006.01)
*A47C 9/00* (2006.01)
*A47C 9/06* (2006.01)

(52) U.S. Cl.
CPC ............... *A47C 9/06* (2013.01); *B64D 11/00* (2013.01); *B64D 11/04* (2013.01); *B64D 11/06* (2013.01); *B64D 11/062* (2014.12); *B64D 11/064* (2014.12)

(58) Field of Classification Search
CPC ............ B64D 11/0627; B64D 11/0636; B64D 11/064; B64D 11/0642; B64D 11/0646; B64D 11/0698; A47C 1/126; A47C 9/06
See application file for complete search history.

(56) References Cited

U.S. PATENT DOCUMENTS

| | | | |
|---|---|---|---|
| 9,840,332 B2 * | 12/2017 | Castanos | ............ B64D 11/0691 |
| 2009/0206200 A1 | 8/2009 | Bolder et al. | |
| 2013/0126672 A1 | 5/2013 | Weitzel et al. | |
| 2014/0209741 A1 | 7/2014 | Boenning et al. | |
| 2014/0224931 A1 | 8/2014 | Weitzel et al. | |
| 2014/0252830 A1 | 9/2014 | Johnson et al. | |
| 2014/0319275 A1 * | 10/2014 | Najd | ...................... B64D 11/02 |
| | | | 244/118.6 |

FOREIGN PATENT DOCUMENTS

| | | | |
|---|---|---|---|
| DE | 102011116521 | 4/2013 | |
| EP | 2724938 | 4/2014 | |
| FR | 2980457 | 3/2013 | |
| FR | 2980457 A1 * | 3/2013 | ............... B64C 1/18 |

* cited by examiner

FLIGHT ATTENDANT SEAT, SYSTEM COMPRISING FLIGHT ATTENDANT SEAT AS WELL AS ARRANGEMENT AND AIRCRAFT AREA COMPRISING SYSTEM

CROSS-REFERENCES TO RELATED APPLICATIONS

This application claims the benefit of the European patent application No. 16 171 020.7 filed on May 24, 2016, the entire disclosures of which are incorporated herein by way of reference.

BACKGROUND OF THE INVENTION

The present application relates to a flight attendant seat movable between a stored position and an exposed position. The present application further relates to a system comprising the flight attendant seat and an aircraft monument to which the flight attendant seat is movably mounted so as to be movable between its stored and exposed positions. A still further aspect of the present application is an arrangement and aircraft area comprising the system, wherein the arrangement in particular is to be used in an aircraft area and the aircraft area in particular is an aircraft cabin area.

The passenger cabin of a modern aircraft typically is equipped with cabin attendant seats which may either be mounted to a wall of a monument installed in the aircraft passenger cabin as described in DE 10 2011 116 521 A1 and corresponding US 2013/0126672 A1 or be attached to the floor of the aircraft passenger cabin as known from DE 10 2008 009 938 A1 and corresponding US 2009/0206200 A1. For short and middle range aircraft, standard cabin attendant seats provide a basic comfort level which accounts for the short time of usage during taxi, take-off and landing. For long range aircraft, high comfort cabin attendant seats are available which may additionally be used for rest periods during cruise. A cabin attendant seat comprising an integrated storage compartment for receiving emergency equipment such as, e.g., survival kits, is described in DE 10 2011 116 519 A1 and corresponding US 2014/0224931 A1.

An aircraft monument with an integrated cabin attendant seat is further known from EP 2 724 938 A1 and corresponding US 2014/0209741 A1. The aircraft monument comprises a first compartment and the cabin attendant seat having a backrest and a seat element. The seat element is movably mounted to the backrest element so as to be moveable relative to the backrest between a folded position, wherein a seat surface of the seat element extends substantially parallel to a backrest surface of the backrest, and an unfolded position, wherein the seat surface of the seat element extends substantially perpendicular to the backrest surface of the backrest. The cabin attendant seat is movable relative to the aircraft monument between a stowed position, wherein the cabin attendant seat, with the seat element being in its folded position, is received in the first compartment of the aircraft monument, and an operating position, wherein the cabin attendant seat is disposed outside of the first compartment of the aircraft monument in a position which allows the seat element to be moved into its unfolded position so that a flight attendant may take a seat.

SUMMARY OF THE INVENTION

An object underlying the present application is the provision of a flight attendant seat which does occupy substantially no additional cabin space when not in use. Further objects of the present application are the provision of an aircraft monument system comprising a flight attendant seat of this kind and the provision of an arrangement as well as an aircraft area, respectively equipped with such aircraft monument system, the aircraft area especially allowing trolley access to face-to-face transversal galleys from a passageway to a Type A door in between these two galleys.

A flight attendant seat according to the present application comprises a carrier device having guiding means with opposed first and second ends, and a storage compartment within which the first end of the guiding means is disposed. The guiding means are adapted to provide guidance along their longitudinal extension between their first and second ends. The flight attendant seat further comprises a plurality of segments. Each of the segments is slidingly mounted to the guiding means so as to allow a sliding movement of the plurality of segments along the guiding means and relative to the carrier device between a stored position of the plurality of segments, in which the plurality of segments is received within the storage compartment of the carrier device, and an exposed position of the plurality of segments. A seat element is pivotally mounted to a first segment of the plurality of segments so as to be pivotable between an inoperative position and an operative position in which a flight attendant may sit down on the seat element. At least one backrest element is respectively mounted to at least one second segment of the plurality of segments. When the plurality of segments is in its exposed position, the seat element when pivoted to its operative position and the at least one backrest element together are adapted to be used by a flight attendant as a flight attendant seat.

The plurality of segments, when exposed, may be locked against sliding movement along the guiding means in at least one exposure position. Any kind of suitable locking mechanism may be used. In the at least one exposure position, the first segment has a predetermined distance to a floor on which the feet of a flight attendant, when using the flight attendant seat, rest. Thereby, different floor-to-seat distances can be provided by selectively locking the first segment in respective different exposure positions along the guiding means. The selective setting of the floor-to-seat distance increases the comfort for the flight attendant as he/she can select a floor-to-seat distance in accordance with his/her body size so as to especially allow selective setting of the eye height of the flight attendant with regard to the direct view requirement.

Otherwise or in addition, it is also conceivable that the second end of the guiding means provides a stop for the segments when exposed. The second end of the guiding means then is adapted to at least fix the segments against further movement in the exposure direction. In this case, the distance of the guiding means second end to a floor is the or a further floor-to-seat distance for the flight attendant seat.

Preferably, the flight attendant seat is positioned within an aircraft cabin to face a passageway between two opposite doors of the cabin, and especially a door access area of the passageway, when in its exposed or operative position. The carrier device can be any kind of aircraft monument, such as a galley monument, storage monument, stowage compartment monument, lavatory, changing room, crew rest compartment, cockpit, video control center, shower room or partition wall. The storage compartment can be located in an upper portion of the carrier device, i.e., near the ceiling of an aircraft cabin. When the carrier device is a partition wall preferably separating a passenger seating area from a passageway between two opposite doors of the cabin, the storage compartment can be located in the region of an overhead luggage compartment and/or be positioned above or take at least part of the space of such an overhead luggage compartment in the passenger cabin. For the latter case, it is alternatively also conceivable that the storage compartment takes the space available below at least one seat of a seating row adjacent the partition wall. In other words, and also generally, the moving direction for storing the flight attendant seat according to the present application may either be upwards towards an aircraft cabin ceiling or downwards towards an aircraft cabin floor, when the flight attendant seat is positioned within an aircraft cabin. Moreover, the guiding path followed by the segments guided by the guiding means can be non-linear and, preferably, the guiding direction in which the segments are guided changes along the guiding path defined by the guiding means by substantially 90°.

The segments of the flight attendant seat are guided in the guiding means preferably like a roller shutter or sectional door. It is also preferred that at least the seat element is moveably connected to the first segment, the first segment is moveably connected to the guiding means, the guiding means are mounted to the carrier device and the carrier device, when positioned within an aircraft cabin, is mounted to a primary structure of the aircraft, such that the requirements as to resistance to and dissipation of the load which may act on the flight attendant seat when used by a flight attendant during taxi, take-off and landing or an emergency situation are met. Of course also, at least one of the further segments may be movably mounted to the guiding means so as to meet the load resistance and dissipation requirements. If the flight attendant seat comprises a locking mechanism for locking the first segment in a floor-to-seat distance, it is further preferred that also the locking mechanism is designed so as to meet the load resistance and dissipation requirements.

The flight attendant seat may further comprise a headrest element mounted to a third segment of the plurality of segments. The headrest element preferably is pivotally mounted to the third segment of the plurality of segments so as to be pivotable between an inoperative position and an operative position in which a flight attendant when using the flight attendant seat may rest a head on the headrest element. The headrest element may be releaseably fixed in its operative position against pivotal movement relative to the third segment. In case the headrest element is pivotally mounted to the third segment, the third segment may be provided with a further backrest element towards which the headrest element is pivotable.

When in the inoperative position, the seat element and, if present, also the headrest element, may be respectively pivoted or folded towards at least one of the plurality of segments and, in particular, at least towards the segment to which the seat element and the headrest element are respectively mounted. With the seat element and, if present, also the headrest element in an inoperative position, the plurality of segments may be moved between its exposed and stored positions.

Adjacent segments of the plurality of segments can be interconnected so as to allow movement of the adjacent segments relative to one another. The relative movement preferably is a pivotal movement and/or a movement to selectively increase or decrease the relative distance of the adjacent segments. A pivotal connection of adjacent segments relative to one another easily allows a non-linear sliding movement of the connected segments along the guiding means. A connection of adjacent segments which allows the adjacent segments to move relative to one another so as to selectively increase or decrease their relative distance allows the segments to be received in the storage compartment in a space-saving manner and, when in exposed position, to spread so as to provide the at least one backrest element in a comfortable position relative to the seating element.

The movement of the plurality of segments between its stored and exposed positions can be performed manually by grasping the segments slidingly guided by the guiding means and pulling the segments out of the storage compartment or pushing the segments into the storage compartment along the guiding means. When the segments are interconnected, it is sufficient to grasp one of the plurality of segments, preferably, the first segment, for pulling/pushing all segments out of/back into the storage compartment. Alternatively, it is also conceivable that the manual movement of the plurality of segments is performed by pulling or releasing a belt mechanism, as it is, for example, known from a roller shutter, or a chain hoist. The movement of the plurality of segments between its stored and exposed positions can also be performed automatically. In the latter case, a motor can be provided to drive a belt mechanism or chain hoist or any other means causing the segments to move between the stored and exposed positions.

The locking mechanism for locking the plurality of segments when exposed against sliding movement along the guiding means in at least one exposure position may be realized by releaseably fixing the belt of the belt mechanism or the chain of the chain hoist relative to the carrier device. For example, the belt may be provided with a plurality of wholes and the carrier device may be provided with a projection or hook-like element to be engaged by the belt holes or chain elements, thereby providing for a step-wise selective setting of the floor-to-seat distance.

The guiding means of the carrier device preferably are a pair of slide rails extending in parallel to one another. Each segment of the plurality of segments is then preferably disposed in between the pair of slide rails so as to be movably mounted thereto with opposed lateral ends thereof to slide along the slide rails between the rails' opposed first and second ends. It is, however, also conceivable that the segments are slidingly mounted to only one or also more than two slide rails extending in parallel, given that the mounting is such that the required load resistance and dissipation is met by the mounting. In the latter case, at least one of the slide rails slidingly engages a part of the segments intermediate their opposed lateral ends. Such an intermediate engagement is also conceivable for a pair of slide rails, thereby providing an alternative pair of slide rails as guiding means.

The flight attendant seat may, of course, comprise a seatbelt structure for securing a flight attendant when sitting on the flight attendant seat. The seatbelt structure can be either mounted to the carrier device or to at least one segment of the plurality of segments in such a manner as to allow resistance to and dissipation of load which may act on the seatbelt structure when a flight attendant is sitting on the flight attendant seat during taxi, take-off and landing as well as an emergency situation, such as a crash situation.

A system in accordance with the present application comprises a flight attendant seat as described above and an aircraft monument, wherein the aircraft monument forms the carrier device of the flight attendant seat.

The aircraft monument may also be in line with the above description but preferably is at least part of a galley.

A galley or a storage monument is known to comprise receiving space for various kinds of standard units, such as for example galley inserts, non-electrical inserts and/or trolleys. For the above system, a receiving space for at least one standard unit of the aircraft monument preferably forms the storage compartment.

The guiding means of the flight attendant seat are arranged on the aircraft moment such that, when the plurality of segments is moved out of its storage compartment, the plurality of segments is located in front of at least a section of an access side of the aircraft monument, the access side being a side of the aircraft monument from which components received in the aircraft monument are accessible. In other words, when the flight attendant seat of the above system is in its exposed or operative position, at a trolley, galley insert and/or non-electrical insert received in the aircraft monument and positioned behind the exposed plurality of segments may not be accessed or even pulled out. When the flight attendant seat is, however, in its inoperative and stored position, all inserts and trolleys received in the aircraft monument are freely accessible to the cabin crew.

Besides the aircraft monument of the above system, at least one further aircraft monument may be provided in spaced apart relationship thereto. The at least one further aircraft monument together with the above system forms an arrangement in accordance with the present application. The spaced apart relationship is such that at least the access side of the system aircraft monument forming the carrier device faces the at least one further aircraft monument.

Finally, the present application provides an aircraft area with a passageway between two opposite aircraft doors and a system as described above, the aircraft area preferably being a cabin area. Within such aircraft area, the system aircraft monument is positioned such that at least the access side of the system aircraft monument forming the carrier device laterally limits the passageway.

Also, in the aircraft area, at least one further aircraft monument may be arranged in spaced apart relationship to the system aircraft monument forming the carrier device. The at least one further aircraft monument then is positioned such that one side thereof laterally limits the passageway on the side opposite the system aircraft monument forming the carrier device. Thereby, the relative arrangement of the system aircraft monument forming the carrier device and the at least one further aircraft monument is such that the access side of the system aircraft monument forming the carrier device faces the at least one further aircraft monument.

By providing a galley monument with a flight attendant seat as described above, it is possible to rearrange the galley catering service of a cabin layout with a Type A door and two adjacent galleys so as to comprise two face-to-face transversal galleys. There is no longer a need for at least one of the two galleys being a longitudinal galley in view of the necessity to provide a cabin attendant seat facing the passageway to the Type A door.

BRIEF DESCRIPTION OF THE DRAWINGS

Preferred embodiments of the present application are now described in more detail with reference to the appended schematic drawings, of which

DETAILED DESCRIPTION OF THE PREFERRED EMBODIMENTS

Figure 1:
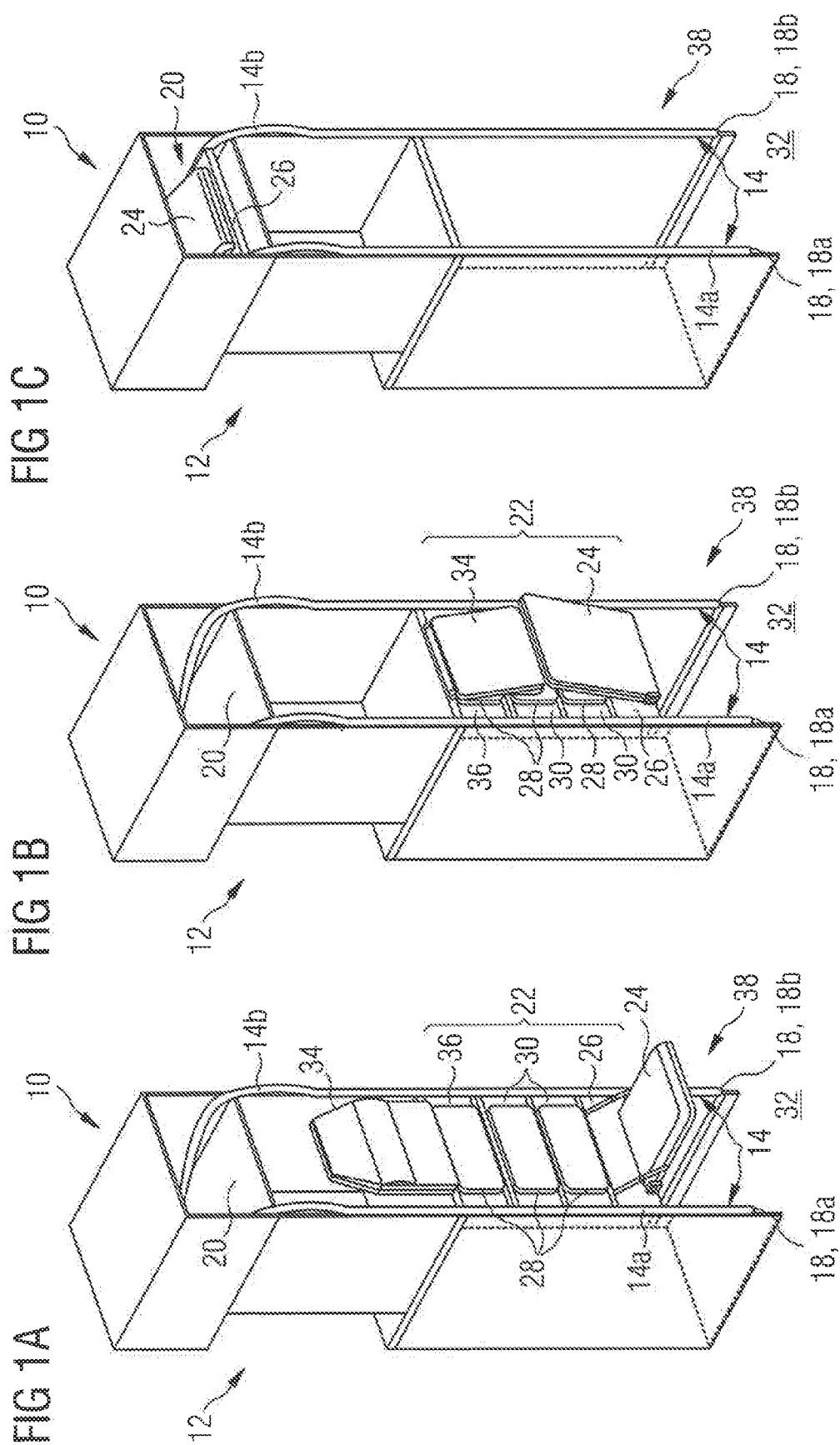
FIG. 1A shows a flight attendant seat of the present application in its exposed and operative position.
FIG. 1B shows the flight attendant seat of FIG. 1A in its exposed but inoperative position.
FIG. 1C shows the flight attendant seat of FIGS. 1A and 1B in its stored position.

In FIGS. 1A to 1C, a flight attendant seat 10 of the present application is shown. The flight attendant seat 10 comprises a carrier device 12 having guiding means 14 with opposed first (not visible throughout the drawings) and second ends 18, and a storage compartment 20 within which the first end of the guiding means 14 is disposed. The guiding means 14 are adapted to provide guidance along their longitudinal extension between their first and second ends 18. A plurality of segments 22, each of which slidingly mounted to the guiding means 14 so as to allow a sliding movement of the plurality of segments 22 along the guiding means 14 and relative to the carrier device 12 between a stored position of the plurality of segments 22, in which the plurality of segments 22 is received within the storage compartment 20 of the carrier device 12 (see FIG. 1C), and an exposed position of the plurality of segments 22 (see FIGS. 1A and 1B). A seat element 24 is pivotally mounted to a first segment 26 of the plurality of segments 22 so as to be pivotable between an inoperative position (see FIG. 1B) and an operative position in which a flight attendant may sit down on the seat element 24 (see FIG. 1A). At least one backrest element 28 is respectively mounted to at least one second segment 30 of the plurality of segments 22. When the plurality of segments 22 is in its exposed position, the seat element 24 when pivoted to its operative position and the at least one backrest element 28 together are adapted to be used by a flight attendant as a flight attendant seat (see FIG. 1A).

As is visible from FIG. 1A, the plurality of segments 22 when exposed is locked against sliding movement along the guiding means 14 in an exposure position. Any kind of suitable locking mechanism may be used. In the exposure position as shown in FIG. 1A, the first segment 26 has a predetermined distance to a floor 32 on which the feet of a flight attendant when using the flight attendant seat 10 rest.

In accordance with FIGS. 1A to 1C, the carrier device 12 of the flight attendant seat 10 is a galley monument. The storage compartment 16 is located in an upper portion of the galley monument carrier device 12, the upper portion being a galley insert and/or non-electrical insert receiving space. The galley monument comprises further storage space, for example for trolleys and, in between the storage compartment 16 and the trolley storage space, for any kind of galley inserts and/or non-electrical inserts.

The segments 22 of the flight attendant seat 10 are guided in the guiding means 14 like a roller shutter or sectional door. At least the seat element 24 is moveably connected to the first segment 26, the first segment 26 is moveably connected to the guiding means 14, the guiding means 14 are mounted to the carrier device 12 and the carrier device 12 is mounted to a primary structure of an aircraft, such that the requirements as to resistance to and dissipation of the load which may act on the flight attendant seat 10 when used by a flight attendant during taxi, take-off and landing or an emergency situation are met. Also the locking mechanism for locking the first segment 26 in a floor-to-seat distance is designed so as to meet the load resistance and dissipation requirements.

The flight attendant seat 10 further comprises a headrest element 34 mounted to a third segment 36 of the plurality of segments 22. The headrest element 34 is pivotally mounted to the third segment 36 of the plurality of segments 22 so as to be pivotable between an inoperative position (see FIG. 1B) and an operative position in which a flight attendant when using the flight attendant seat 10 may rest a head on the headrest element 34 (see FIG. 1A). The headrest element 34 is releaseably fixed in its operative position against pivotal movement relative to the third segment 36. The third segment 36 is provided with a further backrest element 28 towards which the headrest element 36 is pivotable.

When in the inoperative position, the seat element 24 and the headrest element 34 are respectively pivoted or folded towards the segments 22. With the seat element 24 and the headrest element 34 in inoperative position, the plurality of segments 22 can be moved between its exposed and stored positions. FIG. 1B shows the plurality of segments in exposed position and FIG. 1C shows the plurality of segments in stored position within storage compartment 20. The guiding direction in which the segments 22 are guided by the guiding means 14 from their exposed position shown in FIGS. 1A and 1B to their stored position shown in FIG. 1C and vice versa changes along the guiding path defined by the guiding means 14 by substantially 90°.

Adjacent segments 26, 30; 30, 30 and 30, 36 of the plurality of segments 22 are interconnected so as to allow movement of the adjacent segments 26, 30; 30, 30 and 30, 36 relative to one another. The relative movement is a pivotal movement. The pivotal connection of adjacent segments 26, 30; 30, 30 and 30, 36 relative to one another easily allows a non-linear sliding movement of the connected segments 26, 30; 30, 30 and 30, 36 along the guiding means.

For moving the plurality of segments 22 between its stored and exposed positions, a flight attendant simply grasps the first segment 26 and pulls the first segment out of the storage compartment 20 or pushes same into the storage compartment 20 along the guiding means 14.

The guiding means 14 as shown in FIGS. 1A to 1C are a pair of slide rails 14a, 14b extending in parallel to one another. Each segment 26, 30, 36 of the plurality of segments 22 is disposed in between the pair of slide rails 14a, 14b so as to be movably mounted thereto with opposed lateral ends thereof to slide along the slide rails 14a, 14b between the rails' opposed first and second ends 18a, 18b.

When the plurality of segments 22 is moved out of its storage compartment 20 along the guiding means 14, the plurality of segments 22 is located in front of at least a section of an access side 38 of the aircraft monument carrying the flight attendant seat 10. In general, the access side 38 is a side of the aircraft monument from which components received in the aircraft monument are accessible. In other words, when the flight attendant seat 10 is in its exposed or operative position (see FIG. 1A showing the operative position and FIG. 1B showing the exposed position), a trolley, galley insert and/or non-electrical insert received in the aircraft monument, and, thus, positioned behind the exposed plurality of segments 22 (see FIGS. 1A, 1B), may not be accessed or even pulled out. When the flight attendant seat 10 is, however, in its inoperative and stored position (see FIG. 1C), all inserts and trolleys received in the aircraft monument are freely accessible to the cabin crew.

The flight attendant seat 10 comprises a seatbelt structure (not shown throughout the drawings) for securing a flight attendant when sitting on the flight attendant seat 10.

Figure 2:
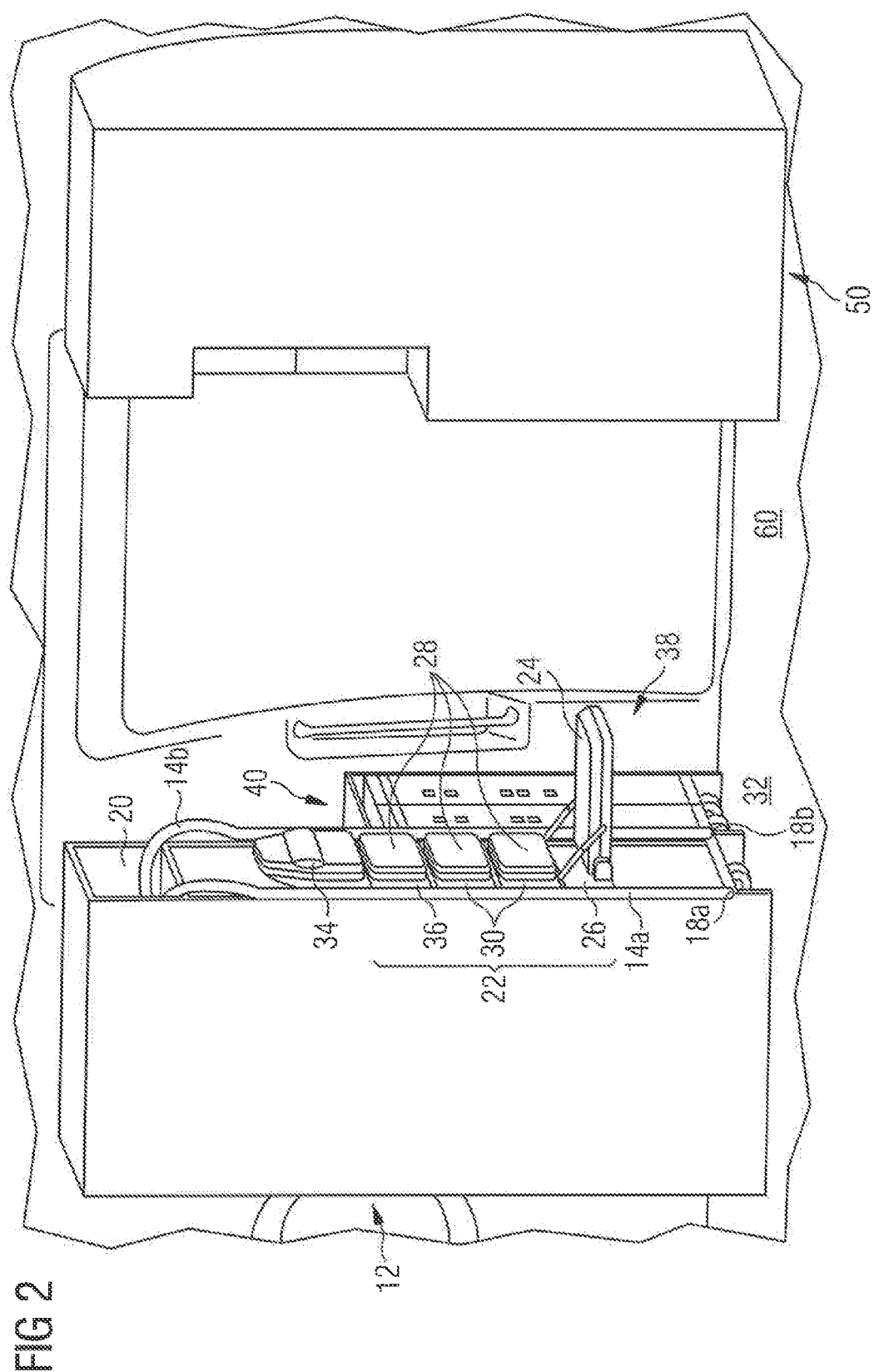
FIG. 2 shows an aircraft cabin area of the present application with the flight attendant seat in its exposed and operative position.

FIG. 2 shows the galley monument carrying the flight attendant seat 10 of FIGS. 1A to 1C in an arrangement with further galley monuments 40, 50 within an aircraft cabin. The aircraft cabin area within which the arrangement is located comprises a passageway 60 between two opposite doors of the cabin the doors especially being Type A doors. The galley monument carrying the flight attendant seat 10 is positioned such that its access side 38 laterally limits the passageway 60. One of the further galley monuments 50 is provided in spaced apart relationship to the galley monument carrying the flight attendant seat 10 such that at least the access side 38 of the galley monument carrying the flight attendant seat 10 faces the further aircraft monument 50. Thereby, the further aircraft monument 50 is positioned such that one side thereof laterally limits the passageway 60 on the side opposite the galley monument carrying the flight attendant seat 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight attendant seat comprising:
   a carrier device having guiding means with opposed first and second ends, and a storage compartment within which the first end of the guiding means is disposed, the guiding means adapted to provide guidance along their longitudinal extension between their first and second ends,
   a plurality of segments each of which slidingly mounted to the guiding means so as to allow a sliding movement of said plurality of segments along the guiding means and relative to the carrier device between a stored position of the plurality of segments, in which the plurality of segments is received within the storage compartment of the carrier device, and an exposed position of the plurality of segments wherein the plurality of segments are removed from the storage compartment,
   a seat element pivotally mounted to a first segment of said plurality of segments so as to be pivotable between an inoperative position and an operative position in which a flight attendant may sit down on the seat element, and
   at least one backrest element respectively mounted to at least one second segment of said plurality of segments,
   wherein, with the plurality of segments being in its exposed position, the seat element, when pivoted to its operative position, and the at least one backrest element together, are adapted to be used by the flight attendant as a flight attendant seat,
   wherein the guidance means guides the plurality of segments on a non-linear guiding path, and
   wherein the seat element and the at least one backrest element are located within the storage compartment in the stored position and slidingly removed from the storage compartment in the exposed position.

2. The flight attendant seat of claim 1, further comprising a headrest element mounted to a third segment of said plurality of segments.

3. The flight attendant seat of claim 2, wherein the headrest element is pivotally mounted to the third segment of said plurality of segments so as to be pivotable between an inoperative position and an operative position in which the flight attendant, when using the flight attendant seat, may rest a head on the headrest element.

4. The flight attendant seat of claim 1, wherein adjacent segments of the plurality of segments are interconnected so as to allow movement of said adjacent segments relative to one another.

5. The flight attendant seat of claim 4, wherein said relative movement is at least one of: pivotal movement or movement to selectively increase or decrease the relative distance of said adjacent segments.

6. The flight attendant seat of claim 1, wherein the guiding means of the carrier device comprise a pair of slide rails extending in parallel to one another.

7. The flight attendant seat of claim 6, wherein each segment of the plurality of segments is disposed in between said pair of slide rails so as to be movably mounted thereto with opposed ends thereof to slide along said slide rails between the rails' opposed first and second ends.

8. The flight attendant seat of claim 1, further comprising a seatbelt structure for securing the flight attendant when sitting on the flight attendant seat, the seatbelt structure mounted to at least one of the carrier device and at least one segment of the plurality of segments.

9. The flight attendant seat of claim 1, wherein the guiding path guides the plurality of segments along a guiding direction wherein the guiding direction of each of the plurality of segments changes along the guiding path by substantially 90°.

10. The flight attendant seat of claim 9, wherein the guiding path is defined a pair of parallel rails.

11. The flight attendant seat of claim 10, wherein the plurality of segments traverses on the pair of parallel rails along the guided path changing by substantially 90°.

12. The flight attendant seat of claim 9 wherein the guiding path includes a first portion substantially transverse to a second portion wherein movement of the plurality of segments along the second portion alters a height of the flight attendant seat, and movement of the plurality of segments along the first portion removes the plurality of segments from the storage compartment.

13. A system comprising:
a flight attendant seat according to claim 1, and
an aircraft monument,
wherein the aircraft monument forms the carrier device.

14. The system of claim 13, wherein the aircraft monument is at least part of a galley.

15. The system of claim 13, wherein a receiving space for standard units of the aircraft monument forms the storage compartment.

16. The system of claim 13, wherein the guiding means are arranged on the aircraft monument such that, when the plurality of segments is moved out of its storage compartment, said plurality of segments is located in front of at least a section of an access side of the aircraft monument, the access side being a side of the aircraft monument from which components received in the aircraft monument are accessible.

17. An arrangement comprising:
a system according to claim 13, and
at least one further aircraft monument spaced apart thereto,
wherein at least the access side of the system aircraft monument forming the carrier device faces the at least one further aircraft monument.

18. An aircraft area having:
a passageway between two opposite doors of the aircraft, and
a system according to claim 13,
wherein at least the access side of the system aircraft monument forming the carrier device laterally limits the passageway.

19. The aircraft area according to claim 18, further having at least one further aircraft monument arranged in spaced apart relationship to the system aircraft monument forming the carrier device, wherein one side of the at least one further aircraft monument laterally limits the passageway on the side opposite the system aircraft monument forming the carrier device, so that the relative arrangement of the system aircraft monument forming the carrier device and the at least one further aircraft monument is such that the access side of the system aircraft monument forming the carrier device faces the at least one further aircraft monument.

* * * * *